United States Patent
Keller

(10) Patent No.: US 10,139,262 B2
(45) Date of Patent: Nov. 27, 2018

(54) METHOD FOR AIR-COUPLED WATER LEVEL METER SYSTEM

(71) Applicant: Carl E. Keller, Santa Fe, NM (US)

(72) Inventor: Carl E. Keller, Santa Fe, NM (US)

( * ) Notice: Subject to any disclaimer, the term of this patent is extended or adjusted under 35 U.S.C. 154(b) by 407 days.

(21) Appl. No.: 14/846,243

(22) Filed: Sep. 4, 2015

(65) Prior Publication Data

US 2016/0069727 A1 Mar. 10, 2016

Related U.S. Application Data

(60) Provisional application No. 62/046,062, filed on Sep. 4, 2014.

(51) Int. Cl.
*G01F 23/14* (2006.01)

(52) U.S. Cl.
CPC .................................. *G01F 23/14* (2013.01)

(58) Field of Classification Search
CPC ......... G01F 23/14; G01F 23/162; E21B 47/04
See application file for complete search history.

(56) References Cited

U.S. PATENT DOCUMENTS

| | | | |
|---|---|---|---|
| 2,162,180 A * | 6/1939 | Odier | G01F 23/16 73/290 B |
| 4,778,553 A | 10/1988 | Wood | |
| 4,840,064 A * | 6/1989 | Fudim | G01F 23/14 141/83 |
| 5,176,207 A | 1/1993 | Keller | |
| 5,246,862 A | 9/1993 | Grey et al. | |
| 5,377,754 A | 1/1995 | Keller | |
| 5,803,666 A | 9/1998 | Keller | |
| 5,804,743 A | 9/1998 | Vroblesky et al. | |
| 5,853,049 A | 12/1998 | Keller | |
| 6,026,900 A | 2/2000 | Keller | |
| 6,038,919 A * | 3/2000 | Schmitt | G01F 17/00 73/149 |
| 6,109,828 A | 8/2000 | Keller | |
| 6,244,846 B1 | 6/2001 | Keller | |
| 6,283,209 B1 | 9/2001 | Keller | |
| 6,910,374 B2 | 6/2005 | Keller | |
| 6,931,925 B2 * | 8/2005 | Huemer | F04B 51/00 73/290 R |
| 7,281,422 B2 | 10/2007 | Keller | |
| 7,753,120 B2 | 7/2010 | Keller | |

(Continued)

OTHER PUBLICATIONS

Keller, C., "Improved Spatial Resolution in Vertical and Horizontal Holes . . . "; Remediation of Hazardous Waste Contaminated Soils; 1994; pp. 513-541; Macel Dekker, Inc.; USA.

(Continued)

*Primary Examiner* — Matthew G Marini
*Assistant Examiner* — Leo T Hinze
(74) *Attorney, Agent, or Firm* — Rod D. Baker

(57) ABSTRACT

A method and system for determining the depth to a water level, particularly depth to a ground water table below Earth's surface. The method can be used to measure the depth to a water table when the only access to the aquifer is a slender tube. A measured quantity of gas is injected into a sealed volume, while recording the pressure change in that volume, allowing a deduction of the size of the sealed volume. Using measurements of the sealed volume and the dimension of the tube containing that volume, the depth to the water level can be calculated.

10 Claims, 8 Drawing Sheets

(56) References Cited

U.S. PATENT DOCUMENTS

| | | |
|---|---|---|
| 7,841,405 B2 | 11/2010 | Keller |
| 7,896,578 B2 | 3/2011 | Keller |
| 7,930,938 B2 * | 4/2011 | Lopushansky .......... G01F 23/14 73/299 |
| 8,069,715 B2 | 12/2011 | Keller |
| 8,176,977 B2 | 5/2012 | Keller |
| 8,424,377 B2 | 4/2013 | Keller |
| 9,008,971 B2 | 4/2015 | Keller |
| 2008/0253934 A1 * | 10/2008 | DiTrolio ................ B01L 3/021 422/400 |
| 2014/0262346 A1 | 9/2014 | Keller |
| 2014/0262347 A1 | 9/2014 | Keller |

OTHER PUBLICATIONS

Cherry, J.A., et al.; "A New Depth-Discrete Multilevel Monitoring Approach for Fractured Rock"; Ground Water Monitoring & Remediation; 2007; pp. 57-70; vol. 27, No. 2; USA.

* cited by examiner

PRIOR ART

METHOD FOR AIR-COUPLED WATER LEVEL METER SYSTEM

CROSS-REFERENCE TO RELATED APPLICATIONS

This application claims priority to and the benefit of the filing of U.S. Provisional Patent Application Ser. No. 62/046,062 entitled "Method for Air Coupled Water Level Meter System," filed 4 Sep. 2014. This application is related to co-pending U.S. Utility patent application Ser. No. 14/827,184 entitled "Method for Slender Tube, Multi-Level, Subsurface Borehole Sampling System" filed 14 Aug. 2015. The entire disclosures of these applications are incorporated herein by reference.

BACKGROUND OF THE INVENTION

Field of the Invention

This invention relates generally to a method for measuring the length of a sealed air column, and more specifically, to a system and method that can be used to measure the depth to a subsurface water table when the only access to the aquifer is a slender tube.

Background Art

Hydrologists normally measure the depth to water in a water well using an electrical water level meter. Such electrical meters typically consist of a wire pair lowered into the well, and which produces an electrical signal when the pair contacts the water surface. Using depth markings on the wire pair, the depth to the water table is determined. Other less common devices use a powder coating on a tape which is wet by the water contact and, when withdrawn from the well, which tape can be measured for the depth to the water surface. These several methods depend upon the access to the well being sufficiently large in diameter to accept the device being lowered into the well. Water levels in tubing disposed down well boreholes are measured in a similar manner to measurements taken in a well bore, but again the tube diameter must allow the passage of the measurement device.

In very deep well bores, or very long tubing emplaced in wells, the cable or tape lowered into the well or tube can adhere to the wall of the well or tube due to wet film adhesion (surface tension of a wet film between the tape or cable and the tubing wall). Such adhesion can produce such a strong bond to the wall of the tube or well that the tape or cable cannot be withdrawn without tensile failure of the tape or cable. This adhesion is aggravated by a well or tube which is not perpendicular to the ground's surface (i.e. vertical), and where the measurement device lies against the wall of the tubular passage to the water level. This is often a problem for wells or tubing with more than 200 feet in depth to the water table.

Another device used to measure the water table in deep wells is a pressure transducer lowered to be located beneath the water table. The transducers used in this technique are relatively expensive.

Techniques used by this applicant, such as that disclosed in U.S. Pat. No. 8,424,377, require an initial or baseline water level measurement to normalize subsequent pressure measurement histories. The method and apparatus disclosed herein allow the depth to the water level to be measured in a very slender tube, with an inside diameter too small to allow the passage of the traditional measurement devices.

SUMMARY OF THE INVENTION

There is disclosed a mode and means to measure the depth, below the surface of the ground, to the water table. A method according to the presently disclosed system and apparatus has not previously been used to measure water level depths in small-diameter, "slender" tubes. A secondary, known vacuum method is mentioned hereinafter to demonstrate a beneficial utility of the overall apparatus, by using the same type of pressure transducer.

There is disclosed an air-coupled water level metering method and system. The method and system find beneficial use when the water level (e.g., ground water table) is to be measured inside tubing too slender for measuring techniques known in the art. Such is the case for some known subsurface borehole monitoring systems using flexible liner systems. However the disclosed apparatus and method can be used to measure the water level in any tube, whether in fluid communication with the subsurface formation water table via a flexible liner, or in a tube contacting the water in the formation in some other manner.

According to the present disclosure, the injection of a measured quantity of gas (air) into a sealed volume, while recording the pressure change in that volume, is undertaken to deduce the size of the sealed volume. Because such an air injection can change the volume of a water-filled tube disposed down a well and in communication with a subsurface aquifer, the volume change must also be used to deduce the initial air volume in the tube. Using the measurement of the air volume and the dimension of the tube containing that volume, the depth to the water table can be calculated with surprising accuracy. This system and method are most useful when exploiting the very high resolution pressure transducers currently available.

A feature of the disclosed method is to incorporate apparatuses that make this innovative measurement practical for the relatively unskilled user. The necessary calculations to relate the volume change to the water level depth are described.

BRIEF DESCRIPTION OF THE DRAWINGS

The attached drawings, which form part of this disclosure, are as follows.

The drawings are not necessarily to scale, within a single view or between views.

DESCRIPTION OF THE INVENTION

Including the Best Mode for Practicing The Invention

There is provided a method and apparatus for determining the depth to a water level in a slender tube, such as a sampling tube in a lined borehole. The invention finds beneficial utility especially when it is not possible to lower down the tube a conventional water level measuring device. Currently known water level meters require access to the water surface to allow a metering device to be lowered to the water surface. For example, to measure the elevation of the water table in a subsurface geologic formation (i.e., the depth of the water below the earth surface), some other reference elevation, it is generally a requirement to contact the water surface with the metering device.

There is disclosed a method and system for determining the depth to a water level, such as a subsurface ground water table, using slender tubes of less than 0.625 inches inside diameter (ID). An advantage of the invention is that such measurements can be made using such slender tubes, but the method and apparatus of the invention are not necessarily so limited; the technique disclosed hereinafter may be beneficially used in larger subsurface tubes, including tubes as large as 2.0 inches ID, as occasion may dictate.

Figure 1:
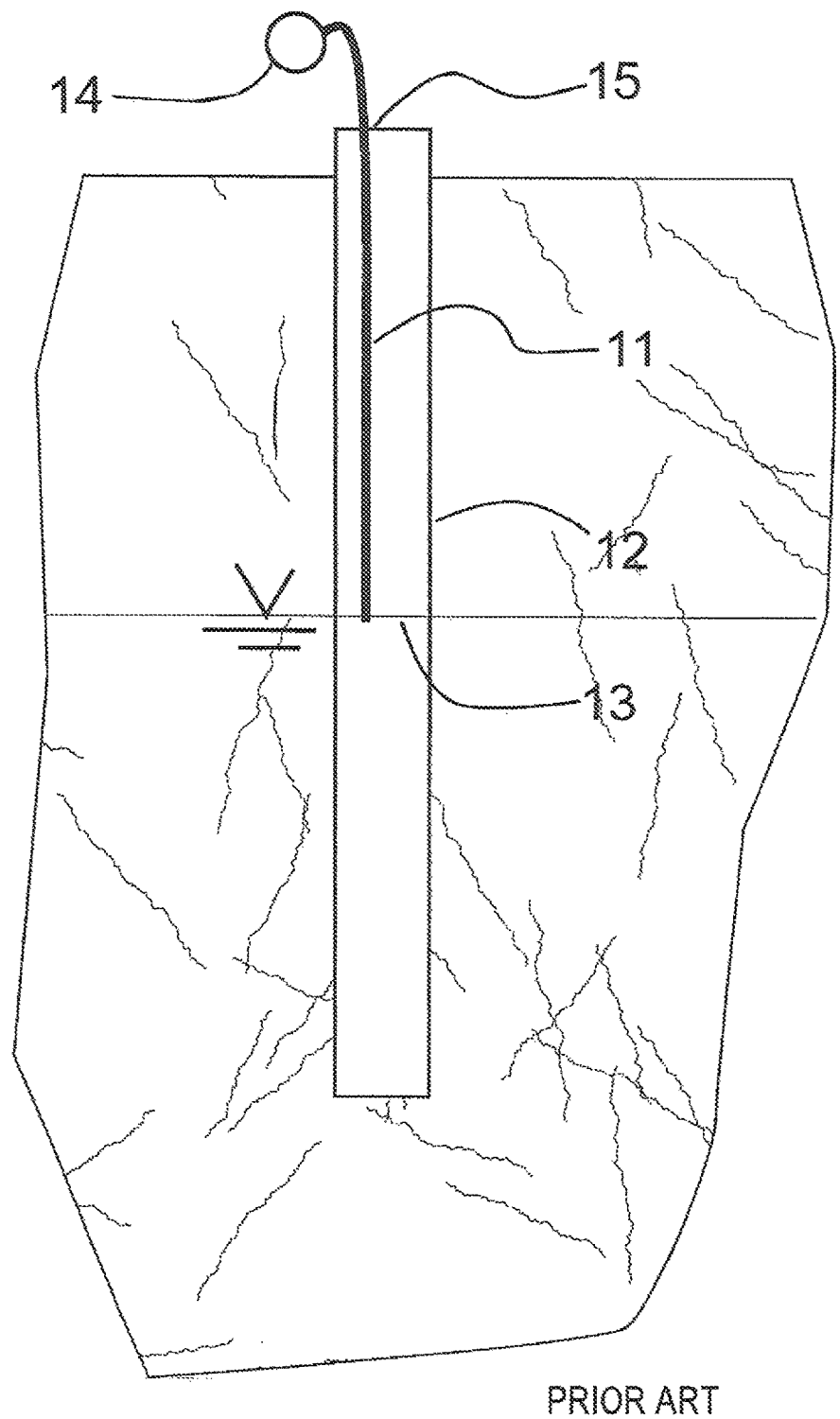
FIG. 1 is an elevation sectional view of a water well with a traditional electric water level meter deployed down to the water table.

The geometry of use of a traditional known method is shown in FIG. 1. An electrical two-conductor cable 11 (e.g., a suitable cable bearing two electrically conducting wires) is lowered into a well 12 and down to the water surface 13. The pair of conductors comes into contact with the water surface 13. The conductivity of the water must be sufficient to cause electrical current to flow between the two conductors, which conduction closes a circuit, causing an audible tone or light on a reel 14 to indicate to the operator that the contact has been made. Depth marks on the cable 11 are read at the reference elevation 15 when the first contact with water is made, thus permitting a direct measurement of the water table depth.

However, there are a variety of conditions under which this known procedure is not possible. If for example the diameter of the well 12 is too small for passage of the electric water level meter 11 down the well, or if the water table 13 depth is too great for the retrieval of the measurement device, the traditional method is not possible. The presence of water on the interior wall of the well 12 also can cause wet film adhesion, or if the well is so tortuous that the drag is excessive when trying to remove the metering device 11, the electric metering device still cannot be used, although the well diameter is sufficiently large to allow the metering device to be lowered to the water table. There are also wells drilled at an angle different from vertical, such that the traditional metering device cannot be lowered to the water table in the well do to the incline in the wall of the well. Another difficulty is encountered when the water in a tube in a well or borehole, whose level is sought to be known, is deionized and thus does not provide the electrical connection upon contact to close the notification circuit. This challenge can be encountered even when the tube diameter is adequate to allow access of the electric meter. In such a situation, the electric water level meter cannot be used. The apparatus and method of the present disclosure, however, can be used in such a circumstance.

Figure 2:
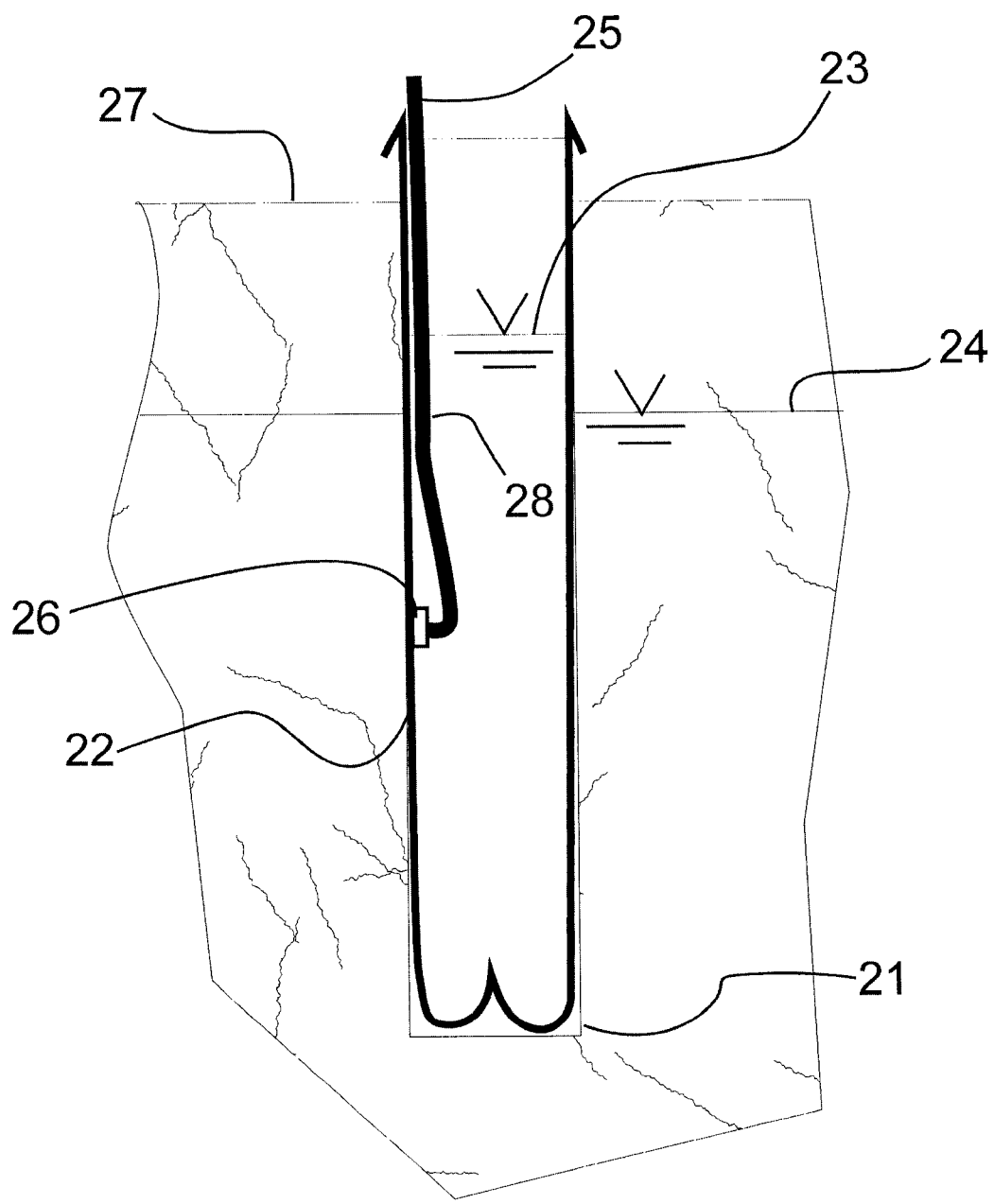
FIG. 2 is an elevation sectional view of a water sampling system using a slender tubing for drawing a water sample from a subsurface aquifer, but which tubing is too small in diameter to allow the use of a conventional water level metering technique such as seen in FIG. 1.

FIG. 2 illustrates a diagrammatic cross section of a borehole 21 lined (as by eversion of a flexible liner) with an impermeable liner 22 and filled with water to a interior level 23 above the ambient water table 24 in the surrounding geologic formation. The higher interior level 23 of water causes the liner 22 to dilate against the borehole wall 21, thereby sealing the borehole. (Notably, the water level 23 inside the interior of the liner 22 is not equal to the water level 24 in the formation.) A tube 25, connected to and in fluid communication with a port 26 through the liner 22 and extending to the surface 27, may have an interior diameter (ID) as small as 0.25 inch. Despite the slenderness of the typical slender sampling tube (i.e., 0.25 inch≤ID≤0.625 inch), the water level 28 in the tube 25 equilibrates to the water level 24 in the subsurface formation. The water level in the tube 25 thus corresponds to the water table 24, such that a measurement of the depth of the water level in the tube 25 also can provide the elevation (depth below the surface of the ground) of the water table. The system geometry and configuration of FIG. 2 can be used for performing multi-level water samplings in a borehole 21; a number of separate ports 26 can be situated to take samples at different elevations in the borehole, each port having an associated tube leading to the surface 27.

It may be desirable or necessary to determine the depth to an ambient water level in a well or borehole—such water level hereinafter referred to as the "water table"—by finding the depth to the water level in a slender tube situated within the well or borehole. When necessary to determine the water level 28 in the tube 25 in order to deduce the water level in the formation 24, it is often not possible to lower a traditional type of water level meter into the tube 25 because the tube's diameter is too small to allow the passage of the conventional meter. The necessity of measurement of the initial water level 28 in the tube is described in, for example, my U.S. patent application Ser. No. 14/827,184, to realize the optimal in beneficial use of the invention described therein. The present disclosure is of a system and method to facilitate such a water level measurement in a practical hydrologic assessment situation. The need to make a water level measurement usually involves sending a technician to the field to perform the measurement. Further, the measurement must be as convenient and rapid as possible due to the need to perform many such measurements in a day.

Figure 3:
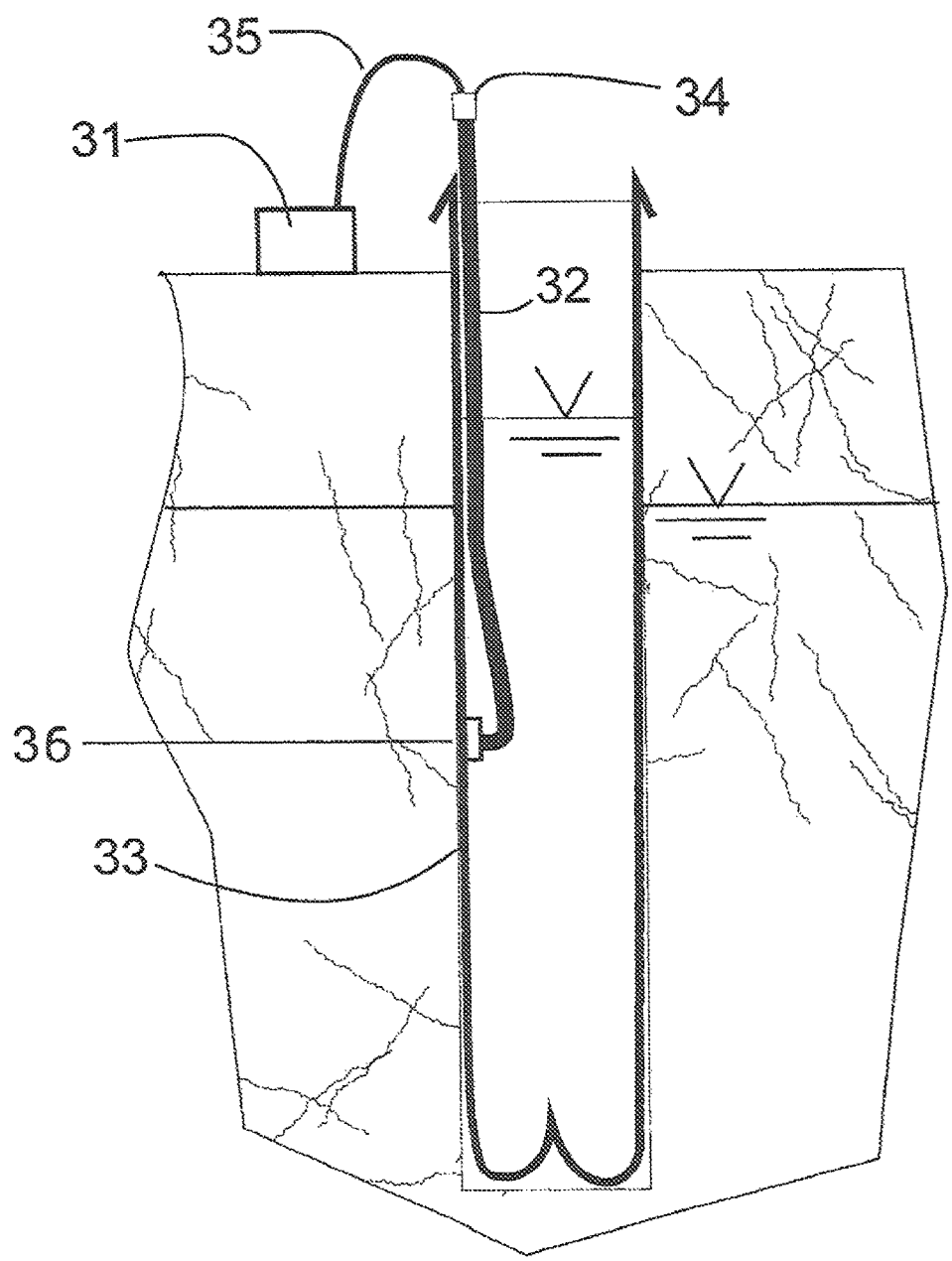
FIG. 3 is an elevation sectional view similar to FIG. 2, showing the provision in a system according to the present disclosure of an air coupled water level meter.

Attention is invited to FIG. 3, which shows the attachment of an air-coupled water level meter 31 to the upper end of a slender tube 32 extending from the interior of a lined hole 33 (as similarly seen in FIG. 2). The connection 34 between the slender tube's upper end and an intermediate metering tube 35 very preferably is air tight, thus sealing the upper end of the tube 32 relative to ambient air pressure. The intermediate tube 35 extending from the meter 31 preferably is a permanent part of the metering apparatus. However, in a typical lined hole 33, there is a plurality of such tubes as slender tube 32 extending to the surface from the interior of the liner 33. Each slender sampling tube has a unique interior water level dependent upon theelevation of its respectively associated port 36. Therefore, the connection 34 may be made sequentially to the plurality of such tubes as tube 32, usually in the order of a numbering system for the tubes. A single tube 32 and port 36 is shown in FIG. 3 for the sake of clarity of illustration, but it thus is understood that a plurality of such tubes and ports can be disposed in a single borehole 33, substantially identical in configuration except that the various ports are disposed at differing elevations within the hole.

Figure 4:
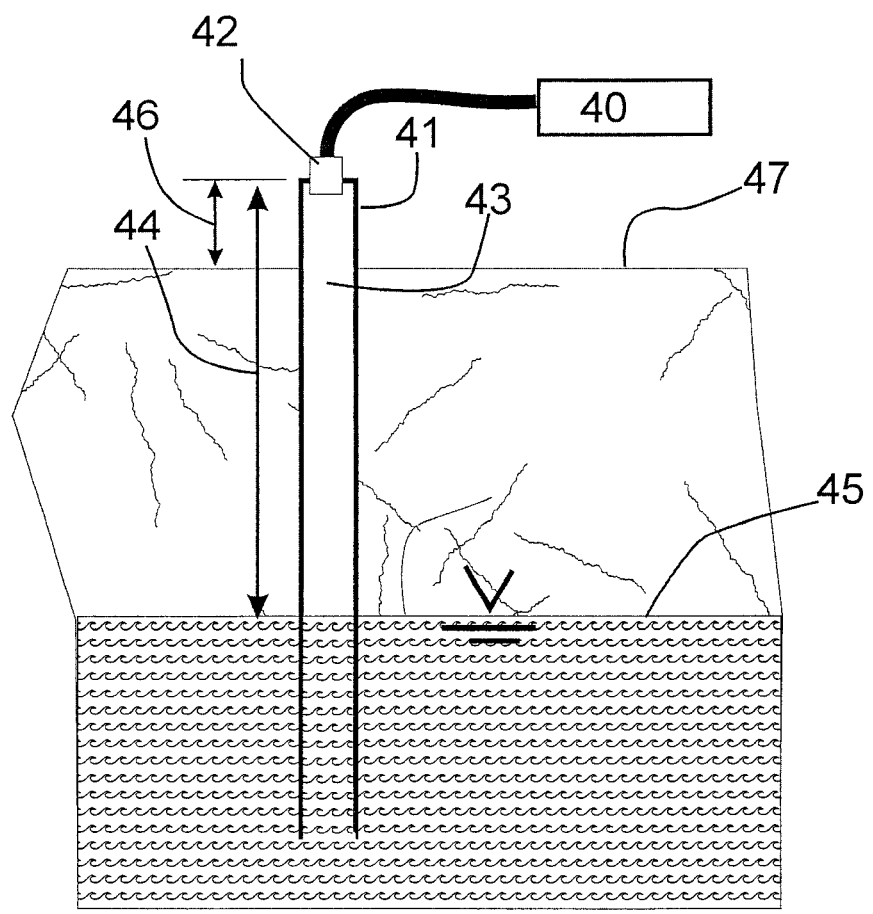
FIG. 4 is an elevation sectional view of a system according to the present disclosure, showing the calculation geometry of the tubing alone used to deduce the water table in a slender tube.

A preferred embodiment of an air-coupled water level meter (AC meter) system and method according to this disclosure is introduced further by reference to FIG. 4, diagramming a tube connection to a water volume. In a fundamental practice of the method of this disclosure, a measured quantity of gas (normally air) is injected (e.g., by syringe 40) into the tube 41 at its sealed upper end or top 42. The air addition increases the number of moles of air in the volume 43 within the tube's interior between the initial or first water level 45 (at the water table) and the sealed top 42. According to the perfect gas law, the added moles of gas increase the pressure to $$Po+\Delta P=(n+\Delta n)RT/Vo$$

where Po is the original or initial pressure in the volume 43 (Vo), n is the original number of moles of gas in the volume Vo, $\Delta n$ is the number of moles injected, R is the universal gas constant, and T is the measured temperature of the gas in volume Vo. Since much of the length of the tube 32 (FIG. 3) is usually beneath the water's surface where the temperature is relatively constant, T is assumed to be constant, and/or it can be measured with a thermocouple insertion in the tube volume 43, Vo. A correction for temperature differences may be done, but is not essential to the basic function of this system because the temperature does not change significantly during the time of measurement. A pressure transducer (shown in FIG. 6) measures the pressure change due to the measured injection of $\Delta n$ moles of air into the volume Vo. The pressure transducer preferably is a high resolution transducer known in the art. (Notably, according to the present invention, the transducer advantageously need not be lowered into the borehole.) One measured pressure change may be the initial peak pressure change, $\Delta P$, which is a maximum change measured abruptly at the time of the injection of the added air, and before the water level in the tube 41 changes (due to the pressure change) significantly from the first water level (i.e., water table 45) in the tube to a second water level in the tube. There also may be measured an equilibrium pressure $\Delta P1$, which is a second pressure change realized and measured after the peak pressure change $\Delta P$ decays to a lower level. The pressure change decay is due to the increased air pressure in the initial volume having displaced the water in the tube back into the formation surrounding the borehole, until the air pressure change equals the water displacement (into the formation) in units of water column equivalence to the air pressure change.

The only unknown in the initial equation immediately above is the volume Vo, because Po=nRT/Vo. Therefore it is plain that Vo=$\Delta n$ R T/$\Delta P$. The volume Vo also is equal to (At)L, where At is the cross section area (from inside diameter) of the interior of tube 41, and L (labeled in FIG. 4 as dimension 44) is the length of the volume 43 in the tube 41 between the sealed upper end 42 and the water surface 45. This length 44, minus the length of the tube above the ground surface (labeled as dimension 46 in FIG. 4, a directly measurable length), is the depth below the ground's surface 47 to the water surface 45 in the tube 41. The depth to the water table 45 thus can be calculated by subtracting the length 46 of the tube above the ground surface from the length 44 of the volume 43 in the tube between the sealed upper end 42 and the water table 45.

Figure 5:
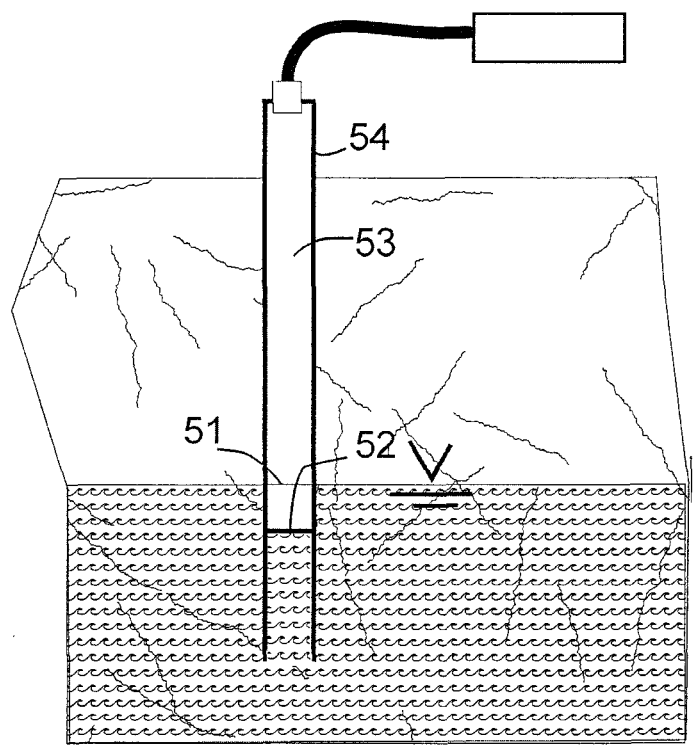
FIG. 5 is an elevation sectional view of a system according to the present disclosure, showing the water table displacement, due to the air injection into the slender tube, when the tube is open to the formation water and in equilibrium with the formation water pressure.
Figure 8:
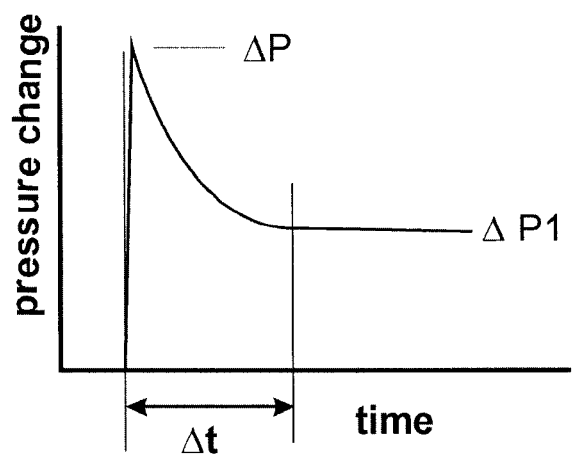
FIG. 8 is a graph of pressure change, plotted versus time, in a slender tube according to the present disclosure.

The foregoing is true if the water level does not change due to the pressure increase in the volume Vo (43); however, as illustrated in FIG. 5, the water level in the tube (tube 54 in FIG. 5, corresponding to tube 41 in FIG. 4) in fact does change, moving rapidly from the original, first, water table level 51 (corresponding to the first level 45 in FIG. 4) to a second, slightly lower, level 52. From hydrologic considerations, the initial, abrupt pressure change $\Delta P$ decays to a level DP1 (see the graph of FIG. 8) due to the increase in air pressure's having displaced the water in the tube into the formation until the air pressure change equals the water displacement (into the formation) in units of water column equivalence to the air pressure change. The pressure change appears as graphed in FIG. 8. Thus the abrupt addition of gas causes the pressure initially to rise by $\Delta P$, and as the water level adjusts to the new pressure in the volume above the water level, the pressure change decays to an equilibrium pressure $\Delta P1$.

Combined reference to FIGS. 3 and 5 shows the displacement of the water level from initial level 51 to second level 52 in the slender tube 54 if the tube is connected to a port 36 (FIG. 3), or if the tube is only open to the water in the formation (FIG. 5). Upon injection of the air and with the associated pressure increase, the water level 51 drops to second level 52 until the pressure change in the air filled volume 53 is equal to the water level change in terms of water column pressure. This condition only occurs if the tube 54 is in fluid communication with an aquifer whose water table does not change. Accordingly, there are two pressure changes that can be used to calculate the volume Vo (volume 53 in FIG. 5), and therefore the depth to the water table 51. One can use the abrupt pressure change, to an initial peak pressure change $\Delta P$, before the water can move significantly in the tube, or alternatively use the long term equilibrium pressure $\Delta P1$. Because the gas injection preferably should be small, the initial peak is a convenient pressure to use. The long term equilibration to $\Delta P1$ may require a substantial delay, $\Delta t$, in the procedure. Also, the use of the equilibrium pressure $\Delta P1$ leads to a quadratic expression for the calculation of Vo (53). If there is any slow leakage of air from the system, the leakage will have a more significant effect on the measurement of $\Delta P1$ at a later time. In that case, the pressure will continue to decay after the nominal equilibrium time $\Delta t$. Nevertheless, a realistic possibility is that the water level may change so quickly that the pressure transducer will not record the peak change, $\Delta P$. In that case the pressure change $\Delta P1$ must be used to calculate the initial volume.

In the latter case, the equation for calculation of the equilibrium pressure change $\Delta P1$ is:

$$\Delta P1=nRT/(Vo-Vs+\Delta P1\ A/980)-Po,$$

where Vs is the syringe volume (i.e., volume of a syringe used to add the measured quantity of gas), and A is the cross section area (from inside diameter) of the tube interior. The number 980 is the acceleration due to gravity (cm/sec$^2$). (Note that if the pressures are all in units of water column as commonly done in hydrogeology, then one can drop the 980 and $\Delta P$ is a length and not a pressure converted to an equivalent water column. The pressures in the equation are in the CGS system and 980 is the acceleration due to gravity.)

Solving this equation for Vo allows the depth to the water table to be calculated as:

$$WT=(Vo-Vs-Vm)/A,$$

where Vm is the volume of the meter (e.g., meter 31, 35 in FIG. 3) and all tubing above the ground's surface (i.e., tubing length 46 in FIG. 4).

Figure 6:
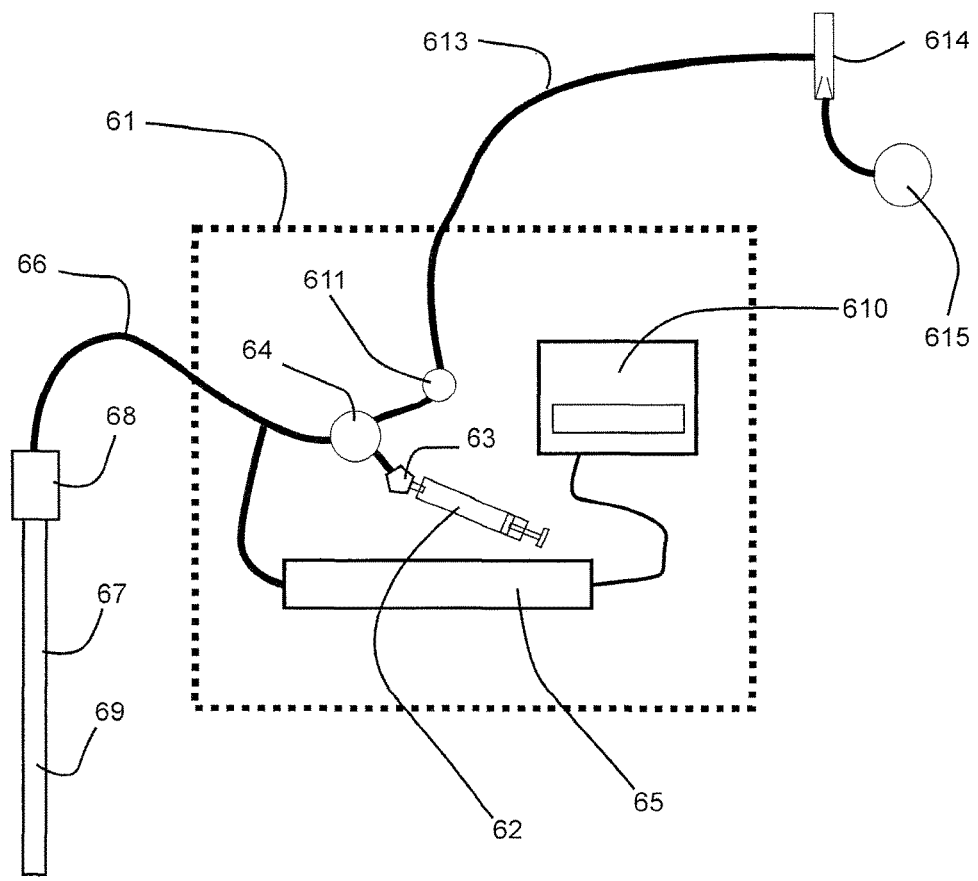
FIG. 6 is a plan view from above showing schematically an arrangement of principal components of a system and apparatus according to the present disclosure.

An embodiment of the apparatus for performing the measurement, according to the present method, is shown schematically in FIG. 6. A suitably rugged housing 61 preferably contains a means for injecting a precisely measured air volume, and for measuring the resulting pressure change. A means for injecting the quantity of air may be a deliberately controllable gauged syringe 62 connected at connection 63 to a tube in communication with a three-way valve 64. The three-way valve 64 connects the syringe 62 to a pressure transducer 65 and a transmission tube 66. The transmission tube 66 is connected, at connection 68, to the slender tube 67 extending from inside the liner (the liner being disposed down, and sealing, the borehole (hole 33 in FIG. 3).

According to the method, the syringe 62 is actuated to inject a measured quantity of air into the slender tube 67, which raises the pressure in the tube volume 69. The pressure transducer 65 in communication with the transmission tube 66 detects and records the pressure rise in the tubing volume 69. The pressure meter 610 also detects and monitors the abrupt pressure rise to Po+ΔP and the subsequent decay to Po+ΔP1. Because the pressure response is detected and recorded at a suitable high frequency, the pressure response can be plotted accurately at a later date. During the air injection, the three-way valve 69 is set such that the syringe 62 is in direct communication with the slender tube 67. The three-way valve 64 can then be closed to seal the transmission tube 66. From the measured pressure change and the known quantity of air injected, the water table depth can be calculated as described above and in accordance with the presently disclosed method.

Figure 7:
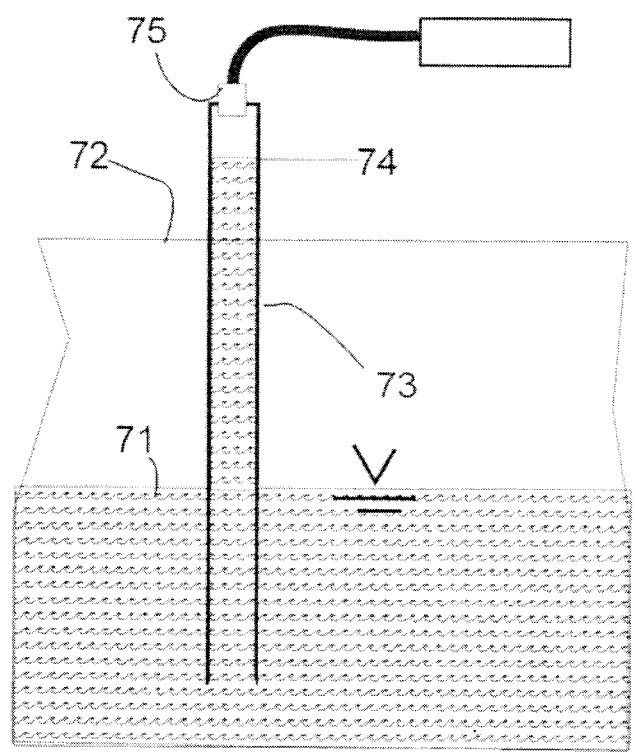
FIG. 7 is a schematic side view showing the geometry of water level measurement according to the present disclosure, using a vacuum application to measure the water table when the bottom end of the tube is in pressure equilibrium with the formation water.

Combined reference to FIGS. 6 and 7 illustrates an alternative technique for measuring the water table depth that is possible if the depth to the water table 71, in the slender sampling tube 73, is less than approximately 25 feet below the surface 72. In such a circumstance, and as seen also with reference to FIG. 6, the three way valve 64 can be adjusted to put the transmission tube 66 in communication with a vacuum tube 613, which in turn is operatively connected to a suitable vacuum source 614. In that situation, and referring to FIG. 7, the vacuum source 614 can be controllably actuated to draw the water level in the tube 73 a distance above the water table 71, so that the new or second water level 74 can be seen in the tube 73 (the tube may be translucent) at a distance below the connection 75. The vacuum tube valve 611 (FIG. 6) allows the vacuum applied to the transmission tube 66 to be controlled, so that the water level in the tube 74 does not rise as high as the connection 75.

When the water level becomes visible in the tube 73, the vacuum tube valve 611 is closed, the vacuum in the tube 66 and tube 67 (corresponding to tube 73 in FIG. 7), is allowed to equilibrate and the vacuum level is measured by the transducer 65 and read on the meter 610 is recorded. The height of the second water level 74 in the tube 73 is measured directly relative to the ground surface 72. The vacuum reading from the meter is converted to an equivalent length of a water column height, and the measured height of the second water level 74 observed above the ground surface 72 is subtracted from the vacuum equivalent water column. The result is the depth (in the tube 73 and below the surface 72) of the original water table 71. While this vacuum technique is not new, it can be performed using the equipment system of the presently disclosed air-coupled water level meter design, and thus enhances the versatility of this disclosed system. A preferable vacuum source 614 is a venturi vacuum pump, driven by an air compressor 615 (FIG. 6). A venturi vacuum pump 614 does not have the undesirable vacuum pulsations of positive displacement vacuum pumps.

While the present invention is contemplated for use in determining a water level in a slender tube, the above-described system and method can be used to measure the length of any isolated volume in a sealed tube. An example is the determination of the depth to a blockage in a vadose gas sampling tube. The injection of a gas volume as described leads to the initial peak pressure shown in the graph of FIG. 8. In such a use, however, there is no decay of the pressure change because there is no water table displacement.

In extremely deep water tables, the use of a normal water level meter is not possible due to wet film adhesion between the tag line and the well casing. In that case, a slender tube can be lowered into the water and the tube volume measurements described hereinabove allows the determination of the water table depth in the open casing. For extremely deep water tables, a larger volume syringe can be used to obtain a more significant, readily detectable, pressure change. An air-coupled water table metering system according to the present invention preferably is equipped with a range of size/volumes of injection syringes to accommodate a wide range of water table depths and tubing volumes.

In some situations actually encountered, the sample tubing in a basic water sampling system, such as the system shown in FIG. 2, becomes kinked, but not sealed, some distance above the water table. In those situations, the water sampling system is still functional, but the water table depth measurement is not possible with an ordinary slender electric water level meter. Nevertheless, the method of the present invention can be used with minimal error due to the reduced tubing volume at the kink for determining the water level in the kinked tube.

In other situations with extreme water table depths, because the use of an electric water level meter is not possible, the multi-level water sampling system is constructed of extremely slender tubing to reduce the weight of the system; pressure transducers deep in the borehole are used to monitor the water level in the formation. However, those transducers often fail. The Air Coupled Transducer (ACT) method of my U.S. Pat. No. 8,424,377 can be used in place of the deep transducer, but an initial water level is required to calibrate the ACT measurement. The system and method of the present disclosure allow the necessary measurement of the initial deep water table.

The disclosures of all U.S. patents and patent applications cited hereinabove are hereby incorporated by reference in their entireties.

Although the invention has been described in detail with particular reference to these preferred embodiments, other embodiments can achieve the same results. The present inventive method can be practiced by employing generally conventional materials and equipment. Accordingly, the details of such materials and equipment are not set forth herein in detail. In this description, specific details are set forth, such as specific materials, structures, chemicals, processes, etc., in order to provide a thorough understanding of the present invention. However, as one having ordinary skill in the art would recognize, the present invention can be practiced without resorting strictly only to the details specifically set forth. In other instances, well known processing structures have not been described in detail, in order not to unnecessarily obscure the present invention.

Only some embodiments of the invention and but a few examples of its versatility are described in the present disclosure. It is understood that the invention is capable of use in various other combinations and is capable of changes or modifications within the scope of the inventive concept as expressed herein. Modifications of the invention will be obvious to those skilled in the art and it is intended to cover in the appended claims all such modifications and equivalents.

What is claimed is:

1. A method for determining a depth to a water table level of ground water below a ground surface, comprising:
   disposing a tube within a borehole and in fluid communication with the ground water;
   extending the tube to the ground surface;
   allowing ground water to fill the tube to a first water level corresponding to the water table level;
   sealing an upper end of the tube to define an initial volume within the tube between the sealed upper end of the tube and the first water level in the tube;
   injecting a measured quantity of gas into the initial volume;
   measuring a pressure change in the initial volume due to the injecting of the measured quantity of gas;
   calculating the initial volume using the measured pressure change in the initial volume and from a cross sectional area of an interior of the tube; and
   using the calculated initial volume to calculate the depth to the water table.

2. The method of claim 1 wherein the step of measuring a pressure change comprises measuring an initial peak pressure change before a water level in the tube changes significantly from the first water level.

3. The method of claim 2, wherein the step of calculating the initial volume comprises using the formula:

$$Vo = \Delta nRT/\Delta P$$

wherein Vo is the initial volume, $\Delta n$ is the number of moles of gas injected into the initial volume, R is the universal gas constant, T is the measured temperature of the gas in the initial volume, and $\Delta P$ is the measured initial peak pressure change.

4. The method of claim 3, wherein the step of using the calculated initial volume to calculate the depth to the water table further comprises subtracting a measured length of the tube above the ground surface from a length of the volume in the tube between the sealed upper end of the tube and the first water level in the tube.

5. The method of claim 4 wherein the step of disposing a tube within a borehole comprises disposing a tube having an inside diameter equal to or less than 0.625 inch.

6. The method of claim 1 further comprising allowing a water level in the tube to move from the first water level to a second water level, and wherein the step of measuring a pressure change comprises measuring, after allowing the water level to move to the second level, an equilibrium pressure after a peak pressure change decays to a lower level.

7. The method of claim 6 wherein the step of injecting a measured quantity of gas comprises injecting with a syringe having a volume, and wherein further the step of calculating the initial volume comprises using the formula:

$$\Delta P1 = nRT/(Vo - Vs - \Delta PA/980) - Po$$

wherein $\Delta P1$ is the equilibrium pressure, n is the initial number of moles in the initial volume, R is the universal gas constant, T is the measured temperature of the gas in the initial volume, Vo is the initial volume, Vs is the syringe volume, A is the cross section area of the tube interior, 980 is the acceleration due to gravity in cm/sec$^2$, and Po is the original pressure in dynes/cm$^2$ in the initial volume.

8. The method of claim 7 wherein the step of measuring a pressure change in the initial volume comprises monitoring with a meter, and wherein further the step of using the calculated initial volume to calculate the depth to the water table further comprises using the formula:

$$WT = (Vo - Vs - Vm)/A,$$

wherein WT is the depth from the ground's surface to the water table, Vo is the initial volume, Vs is the syringe volume, Vm is the volume of the meter and the tube above the ground's surface, and A is the cross section area of the tube interior.

9. The method of claim 7 wherein the step of disposing a tube within a borehole comprises disposing a tube having an inside diameter equal to or less than 0.625 inch.

10. A method for determining a depth to a water table level of ground water below a ground surface, comprising:
   disposing a tube within a borehole and in fluid communication with the ground water;
   extending the tube to the ground surface;
   allowing ground water to fill the tube to a first water level corresponding to the water table level;
   sealing an upper end of the tube to define an initial volume within the tube between the sealed upper end of the tube and the first water level in the tube;
   injecting a measured quantity of gas into the initial volume;
   measuring a pressure change in the initial volume due to the injecting of the measured quantity of gas;
   calculating the initial volume using the measured pressure change in the initial volume and from a cross sectional area of an interior of the tube;
   using the calculated initial volume to calculate the depth to the water table; and
   allowing a water level in the tube to move from the first water level to a second water level;
   wherein the step of measuring a pressure change comprises measuring, after allowing the water level to move to the second level, an equilibrium pressure after a peak pressure change decays to a lower level; and
   wherein the step of measuring a pressure change in the initial volume comprises monitoring with a meter, and wherein further the step of using the calculated initial volume to calculate the depth to the water table further comprises using the formula:

$$WT = (Vo - Vs - Vm)/A,$$

wherein WT is the depth from the ground's surface to the water table, Vo is the initial volume, Vs is the syringe volume, Vm is the volume of the meter and the tube above the ground's surface, and A is the cross-section area of the tube interior.

* * * * *